US012738574B2

(12) United States Patent
Zong et al.

(10) Patent No.: US 12,738,574 B2
(45) Date of Patent: Sep. 15, 2026

(54) BATTERY WITH COATING AND PREPARATION METHOD THEREFOR

(71) Applicant: JIANGSU FAVORED NANOTECHNOLOGY CO., LTD., Wuxi (CN)

(72) Inventors: Jian Zong, Wuxi (CN); Siyue Li, Wuxi (CN)

(73) Assignee: JIANGSU FAVORED NANOTECHNOLOGY CO., LTD., Wuxi (CN)

(*) Notice: Subject to any disclaimer, the term of this patent is extended or adjusted under 35 U.S.C. 154(b) by 479 days.

(21) Appl. No.: 18/562,151

(22) PCT Filed: May 11, 2022

(86) PCT No.: PCT/CN2022/092129
§ 371 (c)(1),
(2) Date: Nov. 17, 2023

(87) PCT Pub. No.: WO2022/247634
PCT Pub. Date: Dec. 1, 2022

(65) Prior Publication Data

US 2024/0243395 A1 Jul. 18, 2024

(30) Foreign Application Priority Data

May 26, 2021 (CN) ......................... 202110580674.3

(51) Int. Cl.

| | |
|---|---|
| ***H01M 50/124*** | (2021.01) |
| ***B05D 1/00*** | (2006.01) |
| ***B05D 3/04*** | (2006.01) |
| ***B05D 7/00*** | (2006.01) |
| ***C09D 135/02*** | (2006.01) |
| ***C09D 183/08*** | (2006.01) |

(52) U.S. Cl.
CPC .......... *H01M 50/1245* (2021.01); *B05D 1/62* (2013.01); *B05D 3/0466* (2013.01); *B05D 3/0486* (2013.01); *B05D 3/0493* (2013.01); *B05D 7/58* (2013.01); *C09D 135/02* (2013.01); *C09D 183/08* (2013.01); *B05D 2508/00* (2013.01); *B05D 2518/10* (2013.01)

(58) Field of Classification Search
CPC ........... H01M 50/1245; H01M 8/0284; H01M 50/121; H01M 50/14; H01M 50/145; H01M 50/124; B05D 1/62; B05D 3/0466; B05D 3/0486; B05D 3/0493; B05D 7/58; B05D 2508/00; B05D 2518/10; B05D 2202/00; B05D 2502/00; B05D 2518/12; B05D 1/60; B05D 1/36; C09D 135/02; C09D 183/08; C09D 183/04; C09D 133/14; C08G 77/20; C23C 16/50; Y02E 60/10
See application file for complete search history.

(56) References Cited

U.S. PATENT DOCUMENTS

| | | | | |
|---|---|---|---|---|
| 6,090,890 A * | 7/2000 | Murakami | ........... | C09D 163/00 525/934 |
| 2013/0115418 A1 | 5/2013 | Young-Dohe et al. | | |
| 2016/0126509 A1* | 5/2016 | Gayden | ............. | H01M 10/0525 29/623.5 |
| 2020/0188954 A1* | 6/2020 | Zong | ..................... | C23C 16/505 |

FOREIGN PATENT DOCUMENTS

| | | | |
|---|---|---|---|
| CN | 105531841 A | | 4/2016 |
| CN | 107523808 A | | 12/2017 |
| CN | 107523809 A | | 12/2017 |
| CN | 108285560 A | | 7/2018 |
| CN | 111635655 | * | 9/2020 |
| CN | 111635655 A | | 9/2020 |
| CN | 111672719 A | | 9/2020 |
| CN | 111675966 A | | 9/2020 |

OTHER PUBLICATIONS

PCT International Search Report issued in International Patent Application No. PCT/CN2022/092129, mailed Jul. 27, 2022.

* cited by examiner

*Primary Examiner* — Lisa S Park
(74) *Attorney, Agent, or Firm* — pH IP Law

(57) ABSTRACT

Provided in a particular embodiment of the present invention is a batter with a coating. In the coating, a plasma coating of a siloxane monomer and an ester monomer of acrylic acid and homologues thereof is used as a base layer; a plasma coating of a multifunctional epoxide of an epoxide monomer with a carbon-carbon double bond structure, an epoxide monomer with a carbon-carbon triple bond structure or an epoxide monomer with two or more epoxy structures and an ester monomer of acrylic acid and the homologues thereof is used as an anti-corrosive layer; a plasma coating of a cyclosiloxane monomer is used as a hydrophobic layer; and all the layers are closely combined with each other to form, on the surface of the battery, an excellent protective coating free of halogens such as fluorine.

17 Claims, No Drawings

BATTERY WITH COATING AND PREPARATION METHOD THEREFOR

CROSS-REFERENCE TO RELATED APPLICATIONS

This application is a U.S. National Stage application under 35 U.S.C. § 371 of International Application No. PCT/CN2022/092129, filed on May 11, 2022, and entitled "BATTERY WITH COATING AND PREPARATION METHOD THEREFOR," which claims the benefit of priority to Chinese Patent Application No. 202110580674.3, filed on May 26, 2021, and entitled "BATTERY WITH COATING AND PREPARATION METHOD THEREOF", the contents of which are incorporated herein by reference in their entireties.

TECHNICAL FIELD

The present disclosure relates to the field of batteries, and more particularly, to a battery with a coating and a preparation method thereof.

BACKGROUND

With developments of electric products, batteries have become more and more widely applied. During normal use or in an accidental exposure to liquids, batteries may be short-circuited and irreparably damaged. In order to improve the waterproof performance of a battery, the battery is usually sealed by a tight waterproof shell, so as to prevent the battery from coming into contact with moisture or sweat and other liquids. By this way, it is unable to avoid a certain wear and an aging of a sealing ring during use. Moreover, a conventional battery structure is prone to a shell corrosion due to excessive moisture on the battery surface, and has poor waterproof and anti-corrosion performances.

SUMMARY

Specific embodiments of the present disclosure provide a battery with excellent waterproof and anti-corrosion performances. Details are as follows.

A battery has a coating, wherein the coating includes a coating I, a coating II, and a coating III covering at least a part of a surface of the battery.

The coating I is a plasma polymerization coating formed by contacting at least a part of the surface of the battery with plasmas including a monomer α and a monomer β. The monomer α is a siloxane monomer, and the monomer β is an acrylic acid, an acrylic acid homologue, an ester of an acrylic acid, or an ester of an acrylic acid homologue.

The coating II is a plasma polymerization coating formed on the coating I by contacting the coating I with plasmas including a monomer γ and a monomer δ. The monomer γ is an epoxy compound monomer including a carbon-carbon double bond structure, an epoxy compound monomer including a carbon-carbon triple bond structure or an epoxy compound monomer including two or more epoxy structures, and the monomer δ is an acrylic acid, an acrylic acid homologue, an ester of an acrylic acid, or an ester of an acrylic acid homologue.

The coating III is a plasma polymerization coating formed on the coating II by contacting the coating II with plasmas including a monomer ε, and the monomer ε is a cyclosiloxane monomer including 3-7 silicon atoms.

Optionally, the monomer α includes one or more selected from a group consisting of: vinyltriethoxysilane, vinyltrimethoxysilane, vinyltris(β-methoxyethoxy)silane, 3-aminopropyltriethoxysilane, N-2-aminoethyl-3-aminopropylmethyldimethoxysilane, N-2-aminoethyl-3-aminopropyltrimethoxysilane, 3-aminopropyltrimethoxysilane, N-phenyl-3-aminopropyltrimethoxysilane, tetraethoxysilane, triethoxysilane, hexamethylcyclotrisiloxane, octamethylcyclotetrasiloxane, decamethylcyclopentasiloxane and dodecamethylcyclohexasiloxane.

Optionally, the monomer α is a siloxane monomer including amino group(s).

Optionally, a structure of the monomer β is as shown in formula (1-1), (1-1)

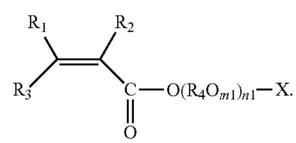

In the formula (1-1), $R_1$, $R_2$ and $R_3$ are respectively independently selected from a group consisting of a hydrogen atom, a $C_1$-$C_{10}$ alkyl and a halogen-substituted $C_1$-$C_{10}$ alkyl. $R_4$ is selected from a group consisting of a $C_2$-$C_{10}$ alkylene and a halogen-substituted $C_2$-$C_{10}$ alkylene. In addition, n1 is an integer ranging from 0 to 10, and m1 is 0 or 1. X is a hydrogen atom or has a structure as shown in formula (1-2), (1-2)

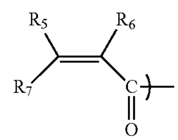

In the formula (1-2), $R_1$, $R_6$ and $R_7$ are respectively independently selected from a group consisting of a hydrogen atom, a $C_1$-$C_{10}$ alkyl and a halogen-substituted $C_1$-$C_{10}$ alkyl.

Optionally, the $R_1$, $R_2$, $R_3$, $R_5$, $R_6$ and $R_7$ are respectively independently selected from a group consisting of a hydrogen atom and a methyl, and $R_4$ is a $C_2$-$C_{10}$ alkylene.

Optionally, the monomer β includes one or more selected from a group consisting of: acrylic acid, hydroxyethyl acrylate, hydroxypropyl acrylate, methacrylic acid, hydroxyethyl methacrylate, hydroxypropyl methacrylate, butyl acrylate, 1,4-butyleneglycol dimethacrylate, 1,6-hexanediol diacrylate, 1,6-hexanediol dimethacrylate, ethyleneglycol dimethacrylate, diethyleneglycol dimethacrylate, triethyleneglycol dimethacrylate, tetraethyleneglycol dimethacrylate, 1,3-butyleneglycol dimethacrylate and neopentylglycol dimethacrylate.

Optionally, the monomer γ includes epoxy structural unit(s) as shown in formula (2-1), (2-1)

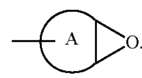

In the formula (2-1), A is a five-membered or six-membered alicyclic structure.

Optionally, the monomer γ includes one or more selected from a group consisting of: 3,4-epoxycyclohexylmethyl-3,4-epoxycyclohexanecarboxylate, 3,4-epoxycyclohexylmethacrylate, 3,4-epoxycyclohexylmethylmethacrylate, 1,2-epoxy-4-vinylcyclohexane, bis(2,3-epoxycyclopentyl) ether, 2,3-epoxycyclopentylcyclopentyl ether, vinylcyclohexene diepoxide, diisoprene diepoxide and bis((3,4-epoxycyclohexyl)methyl) adipate.

Optionally, a structure of the monomer δ is as shown in formula (3-1), (3-1)

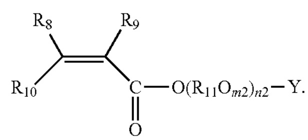

In the formula (3-1), $R_8$, $R_9$, and $R_{10}$ are respectively independently selected from a group consisting of a hydrogen atom, a $C_1$-$C_{10}$ alkyl and a halogen-substituted $C_1$-$C_{10}$ alkyl, $R_{11}$ is selected from a group consisting of a $C_2$-$C_{10}$ alkylene and a halogen-substituted $C_2$-$C_{10}$ alkylene, n2 is an integer ranging from 0 to 10, and m2 is 0 or 1. Y is a hydrogen atom or has a structure as shown in formula (3-2), (3-2)

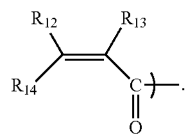

In the formula (3-2), $R_{12}$, $R_{13}$, and $R_{14}$ are respectively independently selected from a group consisting of a hydrogen atom, a $C_1$-$C_{10}$ alkyl and a halogen-substituted $C_1$-$C_{10}$ alkyl.

Optionally, the $R_8$, $R_9$, $R_{10}$, $R_{12}$, $R_{13}$, and $R_{14}$ are respectively independently selected from a group consisting of a hydrogen atom and a methyl, and $R_{11}$ is a $C_2$-$C_{10}$ alkylene.

Optionally, the monomer δ includes one or more selected from a group consisting of: acrylic acid, hydroxyethyl acrylate, hydroxypropyl acrylate, methacrylic acid, hydroxyethyl methacrylate, hydroxypropyl methacrylate, butyl acrylate, 1,4-butyleneglycol dimethacrylate, 1,6-hexanediol diacrylate, 1,6-hexanediol dimethacrylate, ethyleneglycol dimethacrylate, diethyleneglycol dimethacrylate, triethyleneglycol dimethacrylate, tetraethyleneglycol dimethacrylate, 1,3-butyleneglycol dimethacrylate and neopentylglycol dimethacrylate.

Optionally, the monomer δ includes one or more selected from a group consisting of: hexamethylcyclotrisiloxane, octamethylcyclotetrasiloxane, tetramethyltetravinylcyclotetrasiloxane, decamethylcyclopentasiloxane and dodecamethylcyclohexasiloxane.

Optionally, a thickness of the coating ranges from 5 μm to 50 μM.

Optionally, a molar ratio of the monomer α to the monomer β ranges from 1:20 to 20:1.

Optionally, a molar ratio of the monomer γ to the monomer δ ranges from 1:5 to 5:1.

A preparation method of any one of the above batteries with the coatings is provided. The preparation method includes:

placing the battery in a plasma reaction chamber, vacuumizing the plasma reaction chamber to get a vacuum degree in the plasma reaction chamber ranging from 20 mTorr to 250 mTorr, and introducing one or more gases selected from a group consisting of: an inert gas, a nitrogen gas and an oxygen gas;

introducing a mixed vapor including the monomer α and the monomer β into the plasma reaction chamber, and turning on a plasma discharge to form a plasma polymerization coating I on at least a part of a surface of the battery;

introducing a mixed vapor including the monomer γ and the monomer δ into the plasma reaction chamber, and turning on a plasma discharge to form a plasma polymerization coating II on the coating I; and introducing a vapor of the monomer ε into the plasma reaction chamber, and turning on a plasma discharge to form a plasma polymerization coating III on the coating II.

Optionally, the plasma is a pulse plasma or an inductively coupled plasma.

According to some embodiments of the battery with the coating in the present disclosure, a plasma coating formed from a siloxane monomer and an ester-based monomer of an acrylic acid and its homologue is used as a base coating, a plasma coating formed from an epoxy compound of multi-functional-group selected from an epoxy compound monomer including a carbon-carbon double bond structure, an epoxy compound monomer including a carbon-carbon triple bond structure or an epoxy compound monomer including two or more epoxy structures and an ester-based monomer of an acrylic acid and its homologue is used as an anti-corrosion coating, and a plasma coating formed from a cyclosiloxane monomer is used as a hydrophobic coating. The coatings are tightly combined on the surface of the battery to form an excellent protective coating, and may be free of fluorine and other halogen elements.

DETAILED DESCRIPTION

According to some embodiments of the present disclosure, a coating includes a coating I, a coating II, and a coating III covering at least a part of a surface of a battery.

The coating I is a plasma polymerization coating formed by contacting at least a part of the surface of the battery with plasmas including a monomer α and a monomer β, the monomer α is a siloxane monomer, and the monomer β is an acrylic acid, an acrylic acid homologue, an ester of an acrylic acid, or an ester of an acrylic acid homologue.

The coating II is a plasma polymerization coating formed on the coating I by contacting the coating I with plasmas including a monomer γ and a monomer δ, the monomer γ is an epoxy compound monomer including a carbon-carbon double bond structure, an epoxy compound monomer including a carbon-carbon triple bond structure or an epoxy compound monomer including two or more epoxy structures, and the monomer δ is an acrylic acid, an acrylic acid homologue, an ester of an acrylic acid, or an ester of an acrylic acid homologue.

The coating III is a plasma polymerization coating formed on the coating II by contacting the coating II with plasmas including a monomer ε, and the monomer ε is a cyclosiloxane monomer including 3-7 silicon atoms.

According to some embodiments of the present disclosure, the monomer α is a siloxane monomer including amino group(s).

According to some embodiments of the present disclosure, the monomer α includes one or more selected from a group consisting of; vinyltriethoxysilane (CAS number: 78-08-0), vinyltrimethoxysilane (CAS number: 2768-02-7), vinyltris(β-methoxyethoxy)silane (CAS number: 1067-53-4), 3-aminopropyltriethoxysilane (CAS number: 919-30-2), N-2-aminoethyl-3-aminopropylmethyldimethoxysilane (CAS number: 3069-29-2), N-2-aminoethyl-3-aminopropyltrimethoxysilane (CAS number: 1760-24-3), 3-aminopropyltrimethoxysilane (CAS number: 13822-56-5), N-phenyl-3-aminopropyltrimethoxysilane (CAS number: 3068-76-6), tetraethoxysilane (CAS number: 78-10-4), triethoxysilane (CAS number: 998-30-1), hexamethylcyclotrisiloxane (CAS number: 541-05-9), octamethylcyclotetrasiloxane (CAS number: 556-67-2), decamethylcyclopentasiloxane (CAS number: 541-02-6) and dodecamethylcyclohexasiloxane (CAS number: 540-97-6).

According to some embodiments of the present disclosure, a structure of the monomer β is as shown in formula (1-1), (1-1)

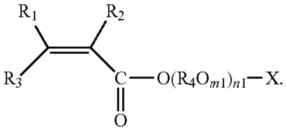

In the formula (1-1), $R_1$, $R_2$ and $R_3$ are respectively independently selected from a group consisting of a hydrogen atom, a $C_1$-$C_{10}$ alkyl and a halogen-substituted $C_1$-$C_{10}$ alkyl, and particularly, $R_1$, $R_2$ and $R_3$ are respectively independently selected from a group consisting of a hydrogen atom, a $C_1$-$C_4$ alkyl and a halogen-substituted $C_1$-$C_4$ alkyl. Considering the impact of halogen elements on environments, according to some embodiments, $R_1$, $R_2$ and $R_3$ are respectively independently selected from a group consisting of a hydrogen atom and a $C_1$-$C_{10}$ alkyl, particularly, $R_1$, $R_2$ and $R_3$ are respectively independently selected from a group consisting of a hydrogen atom and a $C_1$-$C_4$ alkyl, and more particularly, $R_1$, $R_2$ and $R_3$ are respectively independently selected from a group consisting of a hydrogen atom and a methyl. $R_4$ is selected from a group consisting of a $C_2$-$C_{10}$ alkylene and a halogen-substituted $C_2$-$C_{10}$ alkylene. In addition, m1 is 0 or 1, and n1 is an integer ranging from 0 to 10. In specific examples, n1 is 1, and $R_4$ is a $C_2$-$C_{10}$ alkylene such as ethylidene, propylidene, butylidene, pentylidene, etc. Or n1 is 1, and $R_4$ is a halogen-substituted $C_2$-$C_{10}$ alkylene such as halogen-substituted ethylidene, halogen-substituted propylidene, halogen-substituted butylidene, halogen-substituted pentylidene, etc. Or n1 is an integer ranging from 2 to 10, and $R_4$ is selected from ethylidene, propylidene, butylidene, pentylidene, and so on. Considering the impact of halogen elements on environments, according to some embodiments, $R_4$ is a $C_2$-$C_{10}$ alkylene. X is a hydrogen atom or has a structure as shown in formula (1-2).

(1-2)

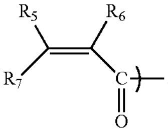

In the formula (1-2), $R_5$, $R_6$ and $R_7$ are respectively independently selected from a group consisting of a hydrogen atom, a $C_1$-$C_{10}$ alkyl and a halogen-substituted $C_1$-$C_{10}$ alkyl. Particularly, $R_5$, $R_6$ and $R_7$ are respectively independently selected from a group consisting of a hydrogen atom, a $C_1$-$C_4$ alkyl and a halogen-substituted $C_1$-$C_4$ alkyl. Considering the impact of halogen elements on environments, according to some embodiments, $R_5$, $R_6$ and $R_7$ are respectively independently selected from a group consisting of a hydrogen atom and a $C_1$-$C_{10}$ alkyl, particularly. $R_5$, $R_6$ and $R_7$ are respectively independently selected from a group consisting of a hydrogen atom and a $C_1$-$C_4$ alkyl, and more particularly, $R_5$, $R_6$ and $R_7$ are respectively independently selected from a group consisting of a hydrogen atom and a methyl.

According to some embodiments of the present disclosure, the monomer β includes one or more selected from a group consisting of: acrylic acid (CAS number: 79-10-7), hydroxyethyl acrylate (CAS number: 818-61-1) `hydroxypropyl acrylate (CAS number: 25584-83-2), methacrylic acid (CAS number: 79-41-4), hydroxyethyl methacrylate (CAS number: 868-77-9) hydroxypropyl methacrylate (CAS number: 27813-02-1), butyl acrylate (CAS number: 141-32-2), 1,4-butyleneglycol dimethacrylate (CAS number: 2082-81-7), 1,6-hexanediol diacrylate (CAS number: 13048-33-4), 1,6-hexanediol dimethacrylate (CAS number: 6606-59-3), ethyleneglycol dimethacrylate (CAS number: 97-90-5), diethyleneglycol dimethacrylate (CAS number: 2358-84-1), triethyleneglycol dimethacrylate (CAS number: 109-16-0), tetraethyleneglycol dimethacrylate (CAS number: 109-17-1), 1,3-butyleneglycol dimethacrylate (CAS number: 1189-08-8) and neopentylglycol dimethacrylate (CAS number: 1985-51-9).

According to some embodiments of the present disclosure, a molar ratio of the monomer α to the monomer β ranges from 1:20 to 20:1, and specifically may be such as 1:20, 2:20, 3:20, 4:20, 5:20, 6:20, 7:20, 8:20, 9:20, 10:20, 11:20, 12:20, 13:20, 14:20, 15:20, 16:20, 17:20, 18:20, 19:20, 20:20, 20:19, 20:18, 20:17, 20:16, 20:15, 20:14, 20:13, 20:12, 20:11, 20:10, 20:9, 20:8, 20:7, 20:6, 20:5, 20:4, 20:3, 20:2, 20:1, etc.

According to some embodiments of the present disclosure, the monomer γ includes epoxy structural unit(s) as shown in formula (2-1), (2-1)

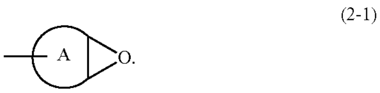

In the formula (2-1), A is a five-membered or six-membered alicyclic structure. According to some embodiments, the alicyclic structure does not include substituent(s). According to some other embodiments, the alicyclic structure includes one or more substituent(s). For example, the substituent(s) may be methyl, ethyl, propyl, butyl or other alkyl, the substituent(s) may also be a fluorine atom, a chlorine atom or other halogen atom, and the substituent(s) may also be fluorine-substituted methyl, chlorine-substituted methyl, fluorine-substituted ethyl, chlorine-substituted ethyl, fluorine-substituted propyl, chlorine-substituted propyl, fluorine-substituted butyl, chlorine-substituted butyl or other halogen-substituted alkyl. Considering the impact of halogen elements on environments, it is preferred that the alicyclic structure has no substituent(s), or the substituent is an alkyl.

According to some embodiments of the present disclosure, the monomer 7 includes one or more selected from a group consisting of; 3,4-epoxycyclohexylmethyl-3,4-epoxycyclohexanecarboxylate (CAS number: 2386-87-0), 3,4-epoxycyclohexylmethacrylate (CAS number: 64630-63-3), 3,4-epoxycyclohexylmethylmethacrylate (CAS number: 82428-30-6), 1,2-epoxy-4-vinylcyclohexane (CAS number: 106-86-5), bis(2,3-epoxycyclopentyl) ether (CAS number: 2386-90-5), 2,3-epoxycyclopentylcyclopentyl ether, vinylcyclohexene diepoxide (CAS number: 106-87-6), diisoprene diepoxide and bis((3,4-epoxycyclohexyl)methyl) adipate (CAS number: 3130-19-6).

According to some embodiments of the present disclosure, a structure of the monomer δ is as shown in formula (3-1), (3-1)

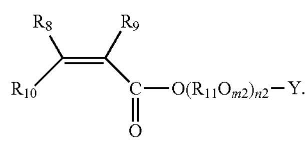

In the formula (3-1), $R_8$, $R_9$, and $R_{10}$ are respectively independently selected from a group consisting of a hydrogen atom, a $C_1$-$C_{10}$ alkyl and a halogen-substituted $C_1$-$C_{10}$ alkyl. Particularly, $R_8$, $R_9$, and $R_{10}$ are respectively independently selected from a group consisting of a hydrogen atom, a $C_1$-$C_4$ alkyl and a halogen-substituted $C_1$-$C_4$ alkyl. Considering the impact of halogen elements on environments, according to some embodiments, $R_8$, $R_9$, and $R_{10}$ are respectively independently selected from a group consisting of a hydrogen atom and a $C_1$-$C_{10}$ alkyl, particularly, $R_8$, $R_9$, and $R_{10}$ are respectively independently selected from a group consisting of a hydrogen atom and a $C_1$-$C_4$ alkyl, and more particularly, $R_8$, $R_9$, and $R_{10}$ are respectively independently selected from a group consisting of a hydrogen atom and a methyl. $R_{11}$ is selected from a group consisting of a $C_2$-$C_{10}$ alkylene and a halogen-substituted $C_2$-$C_{10}$ alkylene. In addition, m2 is 0 or 1, and n2 is an integer ranging from 0 to 10. In specific examples, n2 is 1, and $R_{11}$ is a $C_2$-$C_{10}$ alkylene such as ethylidene, propylidene, butylidene, pentylidene, etc. Or n2 is 1, and $R_{11}$ is a halogen-substituted $C_2$-$C_{10}$ alkylene such as halogen-substituted ethylidene, halogen-substituted propylidene, halogen-substituted butylidene, halogen-substituted pentylidene, etc. Or n2 is an integer ranging from 2 to 10, and $R_{11}$ is selected from ethylidene, propylidene, butylidene, pentylidene, and so on. Considering the impact of halogen elements on environments, according to some embodiments, $R_{11}$ is a $C_2$-$C_{10}$ alkylene. Y is a hydrogen atom or has a structure as shown in formula (3-2).

(3-2)

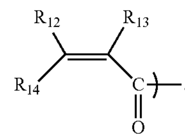

In the formula (3-2), $R_{12}$, $R_{13}$ and $R_{14}$ are respectively independently selected from a group consisting of a hydrogen atom, a $C_1$-$C_{10}$ alkyl and a halogen-substituted $C_1$-$C_{10}$ alkyl. Particularly, $R_{12}$, $R_{13}$ and $R_{14}$ are respectively independently selected from a group consisting of a hydrogen atom, a $C_1$-$C_4$ alkyl and a halogen-substituted $C_1$-$C_4$ alkyl. Considering the impact of halogen elements on environments, according to some embodiments, $R_{12}$, $R_{11}$ and $R_{14}$ are respectively independently selected from a group consisting of a hydrogen atom and a $C_1$-$C_{10}$ alkyl, particularly, $R_{12}$, $R_{13}$ and $R_{14}$ are respectively independently selected from a group consisting of a hydrogen atom and a $C_1$-$C_4$ alkyl, and more particularly, $R_{12}$, $R_{13}$ and $R_{14}$ are respectively independently selected from a group consisting of a hydrogen atom and a methyl.

According to some embodiments of the present disclosure, the monomer δ includes one or more selected from a group consisting of: acrylic acid (CAS number: 79-10-7), hydroxyethyl acrylate (CAS number: 818-61-1) ˋhydroxypropyl acrylate (CAS number: 25584-83-2), methacrylic acid (CAS number: 79-41-4), hydroxyethyl methacrylate (CAS number: 868-77-9), hydroxypropyl methacrylate (CAS number; 27813-02-1), butyl acrylate (CAS number: 141-32-2), 1,4-butyleneglycol dimethacrylate (CAS number; 2082-81-7), 1,6-hexanediol diacrylate (CAS number; 13048-33-4), 1,6-hexanediol dimethacrylate (CAS number: 6606-59-3), ethyleneglycol dimethacrylate (CAS number: 97-90-5), diethyleneglycol dimethacrylate (CAS number: 2358-84-1), triethyleneglycol dimethacrylate (CAS number: 109-16-0), tetraethyleneglycol dimethacrylate (CAS number: 109-17-1), 1,3-butyleneglycol dimethacrylate (CAS number: 1189-08-8) and neopentylglycol dimethacrylate (CAS number: 1985-51-9).

According to some embodiments of the present disclosure, a molar ratio of the monomer γ to the monomer δ ranges from 1:5 to 5:1, and specifically may be such as 1:5, 1:4, 1:3, 1:2.5, 1:2, 1:1.5, 1:1, 1.5:1, 2:1, 2.5:1, 3:1, 4:1, 5:1, etc.

According to some embodiments of the present disclosure, the cyclosiloxane monomer includes one or more mutually independent $C_1$-$C_{10}$ alkyl group(s) or halogen-substituted $C_1$-$C_{10}$ alkyl group(s), particularly, the cyclosiloxane monomer includes one or more mutually independent $C_1$-$C_4$ alkyl group(s) or halogen-substituted $C_1$-$C_4$ alkyl group(s). Considering the impact of halogen elements on environments, according to some embodiments, the cyclosiloxane monomer includes one or more mutually independent $C_1$-$C_{10}$ alkyl group(s), particularly the cyclosiloxane monomer includes one or more mutually independent $C_1$-$C_4$ alkyl group(s), and more particularly, the cyclosiloxane monomer includes one or more mutually independent methyl group(s).

According to some embodiments of the present disclosure, the monomer ε includes one or more selected from a group consisting of: hexamethylcyclotrisiloxane (CAS number: 541-05-9), octamethylcyclotetrasiloxane (CAS number: 556-67-2), decamethylcyclopentasiloxane (CAS number: 541-02-6) and dodecamethylcyclohexasiloxane (CAS number: 540-97-6).

According to some embodiments of the present disclosure, the coating I is a plasma polymerization coating formed by contacting at least a part of the surface of the battery with plasmas of the monomer $\alpha$ and the monomer $\beta$. The coating II is a plasma polymerization coating formed on the coating I by contacting the coating I with plasmas of the monomer $\gamma$ and the monomer $\delta$. The coating III is a plasma polymerization coating formed on the coating II by contacting the coating II with plasmas of the monomer $\varepsilon$. According to some other embodiments, without affecting to the overall performance of the coating I, the coating II, or the coating III, the coating I may be a plasma polymerization coating formed from plasmas including the monomer $\alpha$, the monomer $\beta$ and other suitable monomer(s). The coating II may be a plasma polymerization coating formed on the coating I by contacting the coating I with plasmas including the monomer $\gamma$, the monomer $\delta$ and other suitable monomer(s). The coating III may be a plasma polymerization coating formed on the coating I by contacting the coating II with plasmas including the monomer E and other suitable monomer(s).

According to some embodiments of the present disclosure, the battery may be a primary battery, such as a manganese battery, an alkaline manganese battery, a nickel battery, a lithium battery, a silver oxide battery, etc. The battery may also be a secondary battery, such as a lithium-ion secondary battery, a nickel-hydrogen battery, a nickel-cadmium battery, a lead-acid battery, etc. The battery may also be a fuel cell, such as a phosphoric acid fuel cell, a carbonate fuel cell or a polymer electrolyte fuel cell, etc.

According to some embodiments of the present disclosure, for achieving good salt resistance and sweat resistance, a thickness of the coating ranges from 5 μm to 50 μm.

According to some embodiments of the present disclosure, the battery may be a button battery, a cylindrical battery, a square battery or a special-shaped battery, and so on.

According to some embodiments of the present disclosure, the battery may be a single battery or a single-cell battery, and may also be a battery pack composed of multiple or multi-cell batteries.

According to some embodiments of the present disclosure, the battery may be a mobile phone battery, a laptop battery, a bluetooth headset battery, a watch battery or a battery for a smart wearable device, and so on. According to the present disclosure, the battery with the coating can be effectively prevented from corrosion and short circuit caused by human sweat or moisture during use.

According to some embodiments of the present disclosure, a preparation method of any one of the above batteries with the coatings is provided. The preparation method includes:

placing the battery in a plasma reaction chamber, vacuumizing the plasma reaction chamber to get a vacuum degree in the plasma reaction chamber ranging from 20 mTorr to 250 mTorr, and introducing one or more gases selected from a group consisting of: an inert gas (e.g., He or Ar), a nitrogen gas and an oxygen gas;

introducing a mixed vapor including the monomer $\alpha$ and the monomer $\beta$ into the plasma reaction chamber, and turning on a plasma discharge to form a plasma polymerization coating I on at least a part of a surface of the battery;

introducing a mixed vapor including the monomer $\gamma$ and the monomer $\delta$ into the plasma reaction chamber, and turning on a plasma discharge to form a plasma polymerization coating II on the coating I; and introducing a vapor of the monomer $\varepsilon$ into the plasma reaction chamber, and turning on a plasma discharge to form a plasma polymerization coating III on the coating II.

According to some embodiments of the present disclosure, the monomer $\alpha$, the monomer $\beta$, the monomer $\gamma$, the monomer $\delta$, the monomer $\varepsilon$, the coating I, the coating II, the coating III and the battery are as described above.

According to some embodiments of the present disclosure, in order to further enhance the adhesion between the plasma coating and the surface of the battery, the surface of the battery is pretreated by a continuous wave plasma. Specifically, in an inert gas atmosphere, a plasma discharge is turned on, and the plasma discharge power ranges from 10 W to 500 W. and specifically may be such as 10 W, 50 W, 100 W, 150 W, 200 W, 250 W, 300 W, 350 W, 400 W, 450 W or 500 W. The discharge duration time ranges from 30 s to 3600 s, and specifically may be such as 30 s, 50 s, 100 s, 200 s, 300 s, 400 s, 500 s, 600 s, 1000 s, 1200 s, 1800 s, 2400 s, 3000 s or 3600 s.

According to some embodiments of the present disclosure, the plasma discharge is a pulse plasma discharge. A flow rate of the monomer ranges from 10 μL/min to 2000 μL/min, and specifically may be such as 10 μL/min, 50 μL/min, 100 μL/min, 200 μL/min, 300 μL/min, 400 L/min. 500 μL/min, 1000 μL/min, 1500 μL/min or 2000 μL/min. The temperature in the chamber is controlled to range from 20° C. to 80° C., and specifically may be 20° C., 30° C., 40° C., 50° C., 60° C., 70° C. or 80° C. A vaporization temperature of the monomer ranges from 50° C. to 150° C., specifically may be such as 50° C., 60° C., 70° C., 80° C., 90° C., 100° C., 120° C., 130° C., 140° C. or 150° C., and the vaporization occurs under vacuum conditions. A pulse voltage is applied to discharge to form the pulse plasma. The pulse power ranges from 10 W to 300 W, and specifically may be such as 10 W, 20 W, 30 W, 40 W, 50 W, 60 W, 70 W, 80 W, 90 W, 100 W, 200 W or 300 W. The pulse frequency ranges from 15 Hz to 60 kHz, and specifically may be such as 15 Hz, 20 Hz, 25 Hz, 30 Hz, 35 Hz, 40 Hz, 45 Hz, 50 Hz, 55 Hz, 60 Hz, 100 Hz, 150 Hz, 300 Hz, 500 Hz, 1 kHz, 2 kHz, 3 kHz, 5 kHz, 10 kHz, 20 kHz, 30 kHz, 40 kHz, 50 kHz or 60 kHz. The pulse duty cycle ranges from 1% to 85%, and specifically may be such as 1%, 5%, 10%, 15%, 20%, 25%, 30%, 35%, 40%, 45%, 50%, 55%, 60%, 65%, 70%, 75%, 80% or 85%. The plasma discharge duration time ranges from 100 s to 36000 s, and specifically may be such as 100 s, 500 s, 1000 s, 2000 s, 3000 s, 4000 s, 5000 s, 6000 s, 7000 s, 8000 s, 9000 s, 10000 s, 15000 s, 20000 s, 25000 s, 30000 s or 36000 s.

According to some embodiments of the present disclosure, the plasma discharge methods may be various conventional discharge methods, for example, electrodeless discharge (e.g., radio frequency inductively coupled discharge, microwave discharge), single-electrode discharge (e.g., corona discharge, plasma jet formed by single-electrode discharge), two-electrode discharge (e.g., dielectric barrier discharge, exposed electrode radio frequency glow discharge) and multi-electrode discharge (e.g., discharge using a floating electrode as a third electrode).

The present disclosure is further described in the following specific embodiments.

Description of Tests

In the following embodiments, sweat was prepared in the following manner: sodium chloride (NaCl) of 10 g/L, lactic acid ($C_3H_6O_3$) of 10 g/L, disodium hydrogen phosphate ($Na_2HPO_4$) of 10 g/L, and histidine hydrochloride of 0.25 g/L were added, and then sodium hydroxide (NaOH) was added until pH of the solution reached 4.3±0.2.

Sea salt water was prepared; according to ASTM D1141 standard.

Vibration test: the sample was vibrated according to UN38.3 standard, and then was put into the sweat and the sea salt water for corrosion resistance testing.

Coating thickness test: an American Filmetrics F20-UV film thickness measuring instrument was used for testing.

EMBODIMENTS

Embodiment 1

A button battery (without pack) was placed in a plasma chamber, the chamber was vacuumized to 50 mTorr, and helium gas was introduced at a flow rate of 40 sccm. The plasma discharge was turned on, the pulse power was 200 W, and the pulse duty cycle was 25%. A mixture of 3-aminopropyltriethoxysilane and ethyleneglycol dimethacrylate (the mass ratio was 10:1) was vaporized at a vaporization temperature of 85° C. and then introduced into the chamber for plasma chemical vapor deposition to form a coating I. The flow rate of the mixture was 150 L/min, and the reaction duration time was 3600 s.

Thereafter, a mixture of a monomer of triethyleneglycol dimethacrylate and a monomer of 3,4-epoxycyclohexylmethylmethacrylate (the mass ratio was 1:1) was vaporized at a vaporization temperature of 110° C. and then introduced into the chamber for plasma chemical vapor deposition to form a coating II. The flow rate of the mixture was 200 μL/min. The reaction duration time was 2500 s. The discharge power was 35 W, and the pulse duty cycle was 10%.

Thereafter, a vapor of octamethylcyclotetrasiloxane was introduced at a flow rate of 300 μL/min. The vacuum pressure in the chamber was kept at 50 mTorr, a bias voltage of 600V was applied on the rotatable support, an ICP power was set to be 800 W. and the coating process was performed for 300 s to form a coating III.

After coating, the compressed air was introduced to restore the chamber to normal pressure. The button battery (without pack) was taken out and put into the sweat and the sea salt water for corrosion resistance testing. The test results are listed in Table 1 below.

Embodiment 2

A button battery (pack) was placed in a plasma chamber, the chamber was vacuumized to 60 mTorr, and helium gas was introduced at a flow rate of 80 sccm. The plasma discharge was turned on, the pulse power was 150 W, and the pulse duty cycle was 15%. A mixture of 3-aminopropyltriethoxysilane and hydroxyethyl methacrylate (the mass ratio was 4:3) was vaporized at a vaporization temperature of 85° C. and then introduced into the chamber for plasma chemical vapor deposition to form a coating I. The flow rate of the mixture was 120 μL/min, and the reaction duration time was 1800 s.

Thereafter, a mixture of a monomer of tetraethyleneglycol dimethacrylate and a monomer of vinylcyclohexene diepoxide (the mass ratio was 1:2) was vaporized at a vaporization temperature of 110° C. and then introduced into the chamber for plasma chemical vapor deposition to form a coating II. The flow rate of the mixture was 250 μL/min. The reaction duration time was 2500 s. The discharge power was 37 W, and the pulse duty cycle was 10%.

Thereafter, a vapor of tetramethyltetravinylcyclotetrasiloxane was introduced at a flow rate of 300 μL/min. A pulse radio frequency power of 50 W was applied on the electrode plate, the pulse duty cycle was 3%, and the coating process was performed for 3800 s to form a coating III.

After coating, the compressed air was introduced to restore the chamber to normal pressure. The button battery (pack) was taken out and put into the sweat and the sea salt water for corrosion resistance testing. The test results are listed in Table 1 below.

TABLE 1

Performance Test Results of Embodiments 1-2

| Embodiment | Thickness | Vibration test | Test item | Sample type | Sample quantity | Test time | Results |
|---|---|---|---|---|---|---|---|
| 1 | 6 μm | No | Sweat | cell | 10 | 5 h | No corrosion spots on the surfaces of the batteries |
| | | | Sea salt water | cell | 10 | 216 h | |
| | | Yes | Sweat + Sea salt water | cell | 10 | 5 h + 216 h | |
| 2 | 12 μm | No | Sweat | full pack | 10 | 5 h | |
| | | | Sea salt water | full pack | 10 | 216 h | |
| | | Yes | Sweat + Sea salt water | full pack | 10 | 5 h + 216 h | |

As shown in Table 1 above, the coated button batteries of Embodiment 1 and Embodiment 2 were respectively placed in the sweat for 5 hours and in the sea salt water for 216 hours. After being vibrated, the coated button batteries of Embodiment 1 and Embodiment 2 were respectively placed in the sweat for 5 hours and then placed in the sea salt water for 216 hours. There were no corrosion spots on the surfaces of the batteries.

Although the present disclosure has been disclosed above, the disclosure is not limited hereto. Those skilled in the art can modify and vary the embodiments without departing from the spirit and scope of the present disclosure. Therefore, the scope of protection of the present disclosure shall be subject to the scope defined in claims.

What is claimed is:

1. A battery with a coating, wherein the coating comprises a coating I, a coating II, and a coating III covering at least a part of a surface of the battery, the coating I is a plasma polymerization coating formed by contacting at least a part of the surface of the battery with plasmas comprising a monomer α and a monomer β, the monomer α is a siloxane monomer, and the monomer β is an acrylic acid, an acrylic acid homologue, an ester of an acrylic acid, or an ester of an acrylic acid homologue;

the coating II is a plasma polymerization coating formed on the coating I by contacting the coating I with plasmas comprising a monomer γ and a monomer δ, the monomer γ is an epoxy compound monomer comprising a carbon-carbon double bond structure, an epoxy compound monomer comprising a carbon-carbon triple bond structure or an epoxy compound monomer comprising two or more epoxy structures, and the monomer δ is an acrylic acid, an acrylic acid homologue, an ester of an acrylic acid, or an ester of an acrylic acid homologue; and the coating III is a plasma polymerization coating formed on the coating II by contacting the coating II with plasmas comprising a monomer ε, and the monomer ε is a cyclosiloxane monomer comprising 3-7 silicon atoms.

2. The battery according to claim 1, wherein the monomer α comprises one or more selected from a group consisting of: vinyltriethoxysilane, vinyltrimethoxysilane, vinyltris(β-methoxyethoxy)silane, 3-aminopropyltriethoxysilane, N-2-aminoethyl-3-aminopropylmethyldimethoxysilane, N-2-aminoethyl-3-aminopropyltrimethoxysilane, 3-aminopropyltrimethoxysilane, N-phenyl-3-aminopropyltrimethoxysilane, tetraethoxysilane, triethoxysilane, hexamethylcyclotrisiloxane, octamethylcyclotetrasiloxane, decamethylcyclopentasiloxane and dodecamethylcyclohexasiloxane.

3. The battery according to claim 1, wherein the monomer α is a siloxane monomer comprising amino group(s).

4. The battery according to claim 1, wherein a structure of the monomer β is as shown in formula (1-1), (1-1)

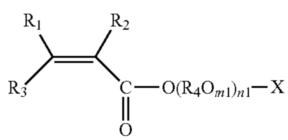

wherein $R_1$, $R_2$ and $R_3$ are respectively independently selected from a group consisting of a hydrogen atom, a $C_1$-$C_{10}$ alkyl and a halogen-substituted $C_1$-$C_{10}$ alkyl, $R_4$ is selected from a group consisting of a $C_2$-$C_{10}$ alkylene and a halogen-substituted $C_2$-$C_{10}$ alkylene, n1 is an integer ranging from 0 to 10, m1 is 0 or 1, and X is a hydrogen atom or has a structure as shown in formula (1-2), (1-2)

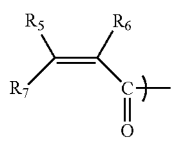

wherein $R_5$, $R_6$ and $R_7$ are respectively independently selected from a group consisting of a hydrogen atom, a $C_1$-$C_{10}$ alkyl and a halogen-substituted $C_1$-$C_{10}$ alkyl.

5. The battery according to claim 4, wherein the $R_1$, $R_2$, $R_3$, $R_5$, $R_6$ and $R_7$ are respectively independently selected from a group consisting of a hydrogen atom and a methyl, and $R_4$ is a $C_2$-$C_{10}$ alkylene.

6. The battery according to claim 5, wherein the monomer β comprises one or more selected from a group consisting of: acrylic acid, hydroxyethyl acrylate, hydroxypropyl acrylate, methacrylic acid, hydroxyethyl methacrylate, hydroxypropyl methacrylate, butyl acrylate, 1,4-butyleneglycol dimethacrylate, 1,6-hexanediol diacrylate, 1,6-hexanediol dimethacrylate, ethyleneglycol dimethacrylate, diethyleneglycol dimethacrylate, triethyleneglycol dimethacrylate, tetraethyleneglycol dimethacrylate, 1,3-butyleneglycol dimethacrylate and neopentylglycol dimethacrylate.

7. The battery according to claim 1, wherein the monomer γ comprises epoxy structural unit(s) as shown in formula (2-1), (2-1)

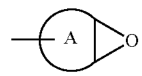

wherein A is a five-membered or six-membered alicyclic structure.

8. The battery according to claim 7, wherein the monomer γ comprises one or more selected from a group consisting of: 3,4-epoxycyclohexylmethyl-3,4-epoxycyclohexanecarboxylate, 3,4-epoxycyclohexylmethacrylate, 3,4-epoxycyclohexylmethylmethacrylate, 1,2-epoxy-4-vinylcyclohexane, bis(2,3-epoxycyclopentyl) ether, 2,3-epoxycyclopentylcyclopentyl ether, vinylcyclohexene diepoxide, diisoprene diepoxide and bis((3,4-epoxycyclohexyl)methyl)adipate.

9. The battery according to claim 1, wherein a structure of the monomer δ is as shown in formula (3-1), (3-1)

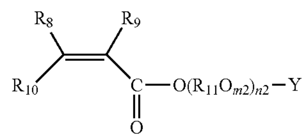

wherein $R_8$, $R_9$, and $R_{10}$ are respectively independently selected from a group consisting of a hydrogen atom, a $C_1$-$C_{10}$ alkyl and a halogen-substituted $C_1$-$C_{10}$ alkyl, $R_{11}$ is selected from a group consisting of a $C_2$-$C_{10}$ alkylene and a halogen-substituted $C_2$-$C_{10}$ alkylene, n2 is an integer ranging from 0 to 10, m2 is 0 or 1, and Y is a hydrogen atom or has a structure as shown in formula (3-2), (3-2)

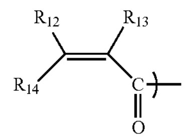

wherein $R_{12}$, $R_{13}$, and $R_{14}$ are respectively independently selected from a group consisting of a hydrogen atom, a $C_1$-$C_{10}$ alkyl and a halogen-substituted $C_1$-$C_{10}$ alkyl.

10. The battery according to claim 9, wherein the $R_8$, $R_9$, $R_{10}$, $R_{12}$, $R_{13}$ and $R_{14}$ are respectively independently selected from a group consisting of a hydrogen atom and a methyl, and $R_{11}$ is a $C_2$-$C_{10}$ alkylene.

11. The battery according to claim 10, wherein the monomer δ comprises one or more selected from a group consisting of: acrylic acid, hydroxyethyl acrylate, hydroxypropyl acrylate, methacrylic acid, hydroxyethyl methacrylate, hydroxypropyl methacrylate, butyl acrylate, 1,4-butyleneglycol dimethacrylate, 1,6-hexanediol diacrylate, 1,6-hexanediol dimethacrylate, ethyleneglycol dimethacrylate, diethyleneglycol dimethacrylate, triethyleneglycol dimethacrylate, tetraethyleneglycol dimethacrylate, 1,3-butyleneglycol dimethacrylate and neopentylglycol dimethacrylate.

12. The battery according to claim 1, wherein the monomer ε comprises one or more selected from a group consisting of: hexamethylcyclotrisiloxane, octamethylcyclotetrasiloxane, tetramethyltetravinylcyclotetrasiloxane, decamethylcyclopentasiloxane and dodecamethylcyclohexasiloxane.

13. The battery according to claim 1, wherein a thickness of the coating ranges from 5 μm to 50 μm.

14. The battery according to claim 1, wherein a molar ratio of the monomer α to the monomer β ranges from 1:20 to 20:1.

15. The battery according to claim 1, wherein a molar ratio of the monomer γ to the monomer δ ranges from 1:5 to 5:1.

16. A preparation method of the battery with the coating as claimed in claim 1, comprising:

placing the battery in a plasma reaction chamber, vacuumizing the plasma reaction chamber to get a vacuum degree in the plasma reaction chamber ranging from 20 mTorr to 250 mTorr, and introducing one or more gases selected from a group consisting of: an inert gas, a nitrogen gas and an oxygen gas;

introducing a mixed vapor comprising the monomer α and the monomer β into the plasma reaction chamber, and turning on a plasma discharge to form a plasma polymerization coating I on at least a part of a surface of the battery;

introducing a mixed vapor comprising the monomer γ and the monomer δ into the plasma reaction chamber, and turning on a plasma discharge to form a plasma polymerization coating II on the coating I; and introducing a vapor of the monomer ε into the plasma reaction chamber, and turning on a plasma discharge to form a plasma polymerization coating III on the coating II.

17. The preparation method according to claim 16, wherein the plasma is a pulse plasma or an inductively coupled plasma.

* * * * *